United States Patent [19]

Hemens

[11] Patent Number: 4,519,294
[45] Date of Patent: May 28, 1985

[54] POWER ASSISTANCE CONTROL DEVICE

[75] Inventor: James F. Hemens, Billericay, England

[73] Assignee: Teleflex Morse Limited, Basildon, England

[21] Appl. No.: 532,536

[22] Filed: Sep. 15, 1983

[30] Foreign Application Priority Data

Sep. 16, 1982 [GB] United Kingdom ............... 8226439

[51] Int. Cl.$^3$ ............................................. F15B 9/10
[52] U.S. Cl. ........................................ 91/374; 91/387; 74/473 R
[58] Field of Search ................. 91/387, 374, 51; 74/473 R, 473 P

[56] References Cited

U.S. PATENT DOCUMENTS

| | | | |
|---|---|---|---|
| 2,597,799 | 5/1952 | Howard | 91/374 |
| 2,757,748 | 8/1956 | MacDuff | 91/374 |
| 3,208,352 | 9/1965 | Lucien | 91/51 |
| 3,930,436 | 1/1976 | Hedenberg | 91/51 |

Primary Examiner—Paul E. Maslousky
Attorney, Agent, or Firm—James Creighton Wray

[57] ABSTRACT

A power assistance device has a double acting piston and cylinder whose piston rod is connected to an output. Compressed air is passed via a pair of air pressure regulators to opposite sides of the piston. Each regulator has a regulator spring, and the regulators are housed in a body which is moved upon manual effort being applied to an input to cause the springs to differentially bias so decreasing pressure on one side of the piston and increasing pressure on its opposite side, creating a pressure differential across the piston causing it to move with its piston rod to apply a magnified load to the output which is proportional to the manual effort applied to the input. The regulators could be set so that in a neutral position of the power assistance device, zero pressures exist on opposite sides of the piston. In an alternative arrangement a pair of single acting piston and cylinder devices could be used. Other gaseous fluids could be utilized, and a hydraulic fluid could also be used as the pressurized fluid medium.

10 Claims, 5 Drawing Figures

POWER ASSISTANCE CONTROL DEVICE

The present invention relates to a power assistance device for assisting an operator to perform a function which would require considerable force.

In mechanical systems, an operation requiring considerable force can be performed by an operator by means of the simple expedient of increasing the length of a lever used by the operator. There are, however, limits to how long one can conveniently make the length of a lever. For this reason, power assistance devices have been proposed. In this case, the power for carrying out an operation is provided partly by an operator and partly by pressurized fluid e.g. gas or liquid. It is customary in power assistance devices to supply pressurized fluid to a piston and cylinder device which is used to effect the desired operation.

In one such power assistance device, supply of pressurized fluid to the piston and cylinder device is controlled by a 3 piston/5 port valve which is under the control of the operator. In the neutral position both sides of the piston are open to atmosphere through the valve. When the operator desires movement in one direction, the valve is moved to cause pressurized fluid to be fed to one side of the piston with the other open to atmosphere. This causes the piston to move. The difficulty with this type of system is that it is basically an off/on type of system without smooth control and also the piston tends to overshoot the desired piston which in some cases, due to the lack of smooth control, leads to the piston hitting an end of the cylinder.

According to the invention there is provided a power assistance device comprising an input, an output, power assistance means between the input and output, the power assistance means having fluid operated piston means whose piston rod means applies load to the output, and regulator means operable substantially simultaneously with operation of said input to vary the fluid pressure acting on the piston means of the power assistance means such that the effort applied by the piston rod means to the output is proportional to the effort applied to the input.

A preferred power assistance device constructed in accordance with the invention incorporates a regulator device for controlling the flow of pressurized air to a double acting pneumatic piston and cylinder device so that in a neutral position, equal pressures above atmospheric pressure exist on either side of the piston. Movement of the piston is achieved by causing a differential pressure to exist across the piston. Preferably, the regulator device comprises two spring controlled pressure regulators each of which is associated with a respective side of the piston and cylinder device. The advantage of this arrangement is that the pressure difference across the piston is proportional to spring load and not displacement. Manual effort acts on opposed pressure regulating springs to simultaneously vary opposing cylinder pressures causing cylinder effort proportional to manual effort to the limit of supply pressure. Thereafter mechanical stops add increased manual effort to cylinder effort.

A power assistance device may also be constructed within the scope of the present invention as claimed to use hydraulic fluid as the fluid pressure medium.

In order that the invention may be well understood there will now be described some embodiments thereof, given by way of example, with reference to the accompanying drawings, in which.

Figure 1:
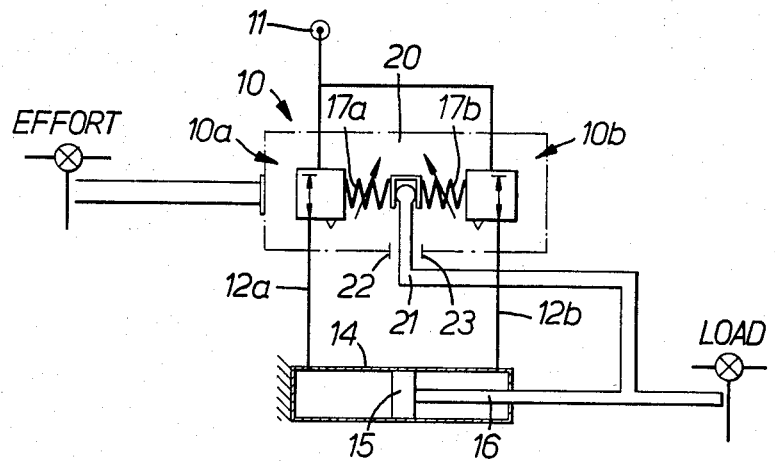
FIG. 1 is a diagrammatic view of a power assistance device embodying the present invention.

As represented in FIG. 1, a power assistance device comprises a pressure regulating device 10 for regulating the pressure from a source of pressurized fluid 11, in particular compressed air. The pressure regulating device 10 is in two regulating parts 10a and 10b and each part has an output 12a or 12b respectively for pressure regulated fluid. The output 12a is connected to a cylinder 14 to supply fluid to one side of a piston 15 while the output 12b is connected to the cylinder 14 to supply fluid to the other side of the piston 15. The piston rod 16 is connected to the load to be moved. The piston rod 16 is also connected to the regulating device 10 by a member 21 so as to move regulator springs 17a, 17b associated with the regulating parts 10a and 10b respectively.

In use under a condition of no manual effort, fluid supplied to both regulators is normally reduced to approx. half supply pressure before feeding to opposing ends of a double acting cylinder such that the forces acting on the piston are statically balanced. An operator commands an operation by, say, moving a lever. This causes the body 20 of the regulating device 10 to move which in turn causes one of the springs 17a, 17b to compress while the other spring expands. Compression of the spring causes the pressure supplied by that regulating part to increase from its neutral level towards the supply pressure while expansion of the other spring causes that pressure regulating part to be relieved to atmosphere. The result of this is that the pressure on one side of the piston 15 rises while the pressure on the other side of the piston 15 falls, thus causing the piston 15 to move.

As the piston moves, the piston rod also moves to effect the desired operation. Due to the connection between the piston rod 16 and the regulating device 10, the springs 17a, 17b are moved by the member 21 to equalise their positions and hence their spring forces which in turn brings the regulator back to its initial condition with equal pressure being supplied to the cylinder 14.

This cycle of operations take place almost instantaneously and thus a smooth control of the movement of the piston rod 16 can be effected.

Advantageously, each regulating part is based on one commercially available pressure relieving regulator such as that sold by Norgren under the designation R16. With these regulators, the manual effort acting on the valve body 20 simultaneously varies the opposing regulating cylinder pressures in proportion to the manual effort to the limit of the supply pressure.

Movement of the body 20 is restricted by two opposed stop member 22, 23 fixed to the body 20. The effect of these is that after a predetermined degree of movement defined by the distance between the stop members, the member 21 comes into contact with one of the stop members which means that for further movement of the piston rod the valve body 20 is carried along with the rod 16 which means that the degree of power assistance is limited so as to prevent the operator from exerting too great a force without realising it. In other words, the stops prevent further movement of the valve body relative to the member 21 and directly couple the manual to the cylinder effort.

Figure 2:
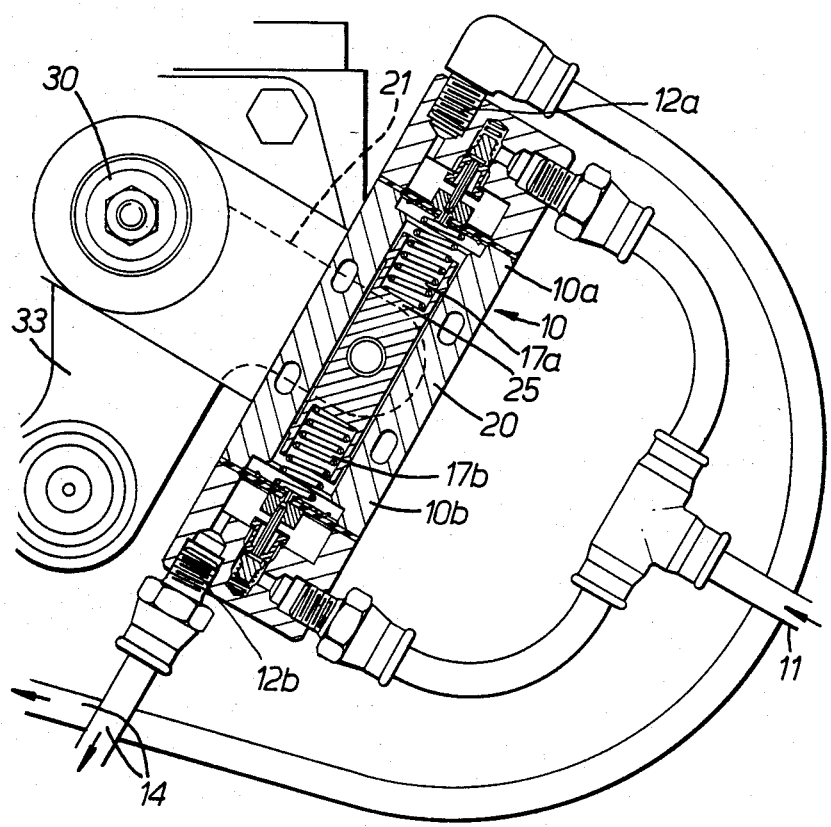
FIG. 2 is a sectional elevational view through a pressure regulator used in the device shown in FIG. 1.

Referring now to FIG. 2, this shows a cross-sectional view of a regulating device according to the present invention. The same reference numerals are used for the same parts already described in relation to FIG. 1. The device is basically symmetrical about the centre line in FIG. 2 and since a commercially available regulator is used for each part of the device these will not be described in detail. Suffice to say that a slide 25 to which the member 21 can be connected is housed within the body 20 and is used to mount one end of each of the regulator springs 17a, 17b. The other end of each spring acts on a diaphragm of one of the regulators, while diaphragm biases a rod to open a lightly spring biased inlet valve to the regulator until such time as the cylinder pressure acting on the diaphragm overcomes the bias of the associated regulator spring.

Although the two regulators are basically the same, there is a difference in their output pressures to compensate for the volume of the piston rod 17 in the cylinder 14 on one side of the piston 15 in FIG. 1. In this embodiment, this is achieved by making the cylinder volumes of the regulators slightly different.

One concrete example of how the power assistance control device described above would be used in practice will now be given but before doing so, it will be emphasised that this is but one use for the device.

Figure 3:
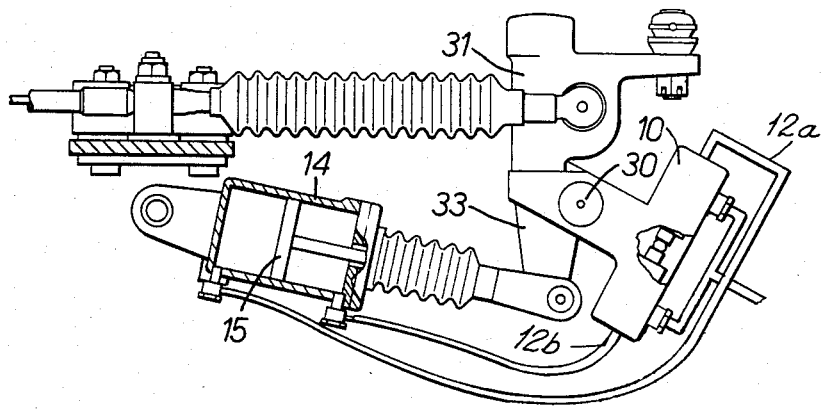
FIG. 3 is a side view partly broken away of one example of a use of the device shown in FIG. 1.

FIG. 3 shows the application of the power assistance device to a gearshift device for gearboxes. FIG. 3 shows a modification to the arrangement described in our U.S. Pat. No. 4,238,972 generally in relation to FIGS. 11 to 15 and more particularly to FIGS. 16 and 17 and thus detailed description of the gearshift device will be omitted and the reader is directed to U.S. Pat. No. 4,238,972 for such description.

A gear box, not shown, has a gear selection and engagement shaft 30 extending from its housing. Mounted on the shaft and rotatable thereabout by means of journals is a translator member 31. Fixed to the translator member 31 is the regulating device 10 shown in detail in FIG. 2. The outputs from the device 10 are connected to the piston and cylinder device 14, 15. The cylinder 14 is pivotally fixed to the gearbox housing and the piston 15 is connected to a member 33 having fast therewith a gear selector and shift member and rigidly fixed to the shaft 30 extending from the gear box housing. The member 21 extends from the member 33 into the regulating device 10 (see FIG. 2).

Movement of the translator member 31 is controlled by push-pull control links or push rods as described in our above identified U.S. patent specification.

In use, to effect engagement of a gear, the translator member 31 is rotated about the shaft 30. This causes movement of the body of the regulating device 10. relative to the member 21 which unbalances the outputs from the device 10 which in turn causes a pressure differential to exist across the piston 15 which then moves. Movement of the piston 15 is transferred to the shaft 30 by the member 33 and movement of the member 33 causes the member 21 to move relative to the body of the device 10 to restore the balance condition.

The above device provides a simple and cost effective solution to the problem of piston overshoot in a power assistance device. Further, it also provides the operator with a good degree of "feel" by virtue of the fact that a degree of manual effort is still involved. The degree of "feel" can be altered by varying the rate of the regulating springs 17a, 17b but in one embodiment of the device additional springs are provided acting on the member 21 parallel to the regulating springs 17a, 17b rather than by altering the springs 17a, 17b themselves.

In an alternative embodiment, the double acting piston and cylinder is replaced by a pair of single acting piston and cylinder whose piston rods make a common connection with each other and whose cylinders are each connected to one of the outlets of the pressure regulating device so that opposing fluid pressures will act on the two pistons and give a result similar to the double acting piston and cylinder.

As a modification, the pressure regulator device could be constructed so that in the neutral position there is zero fluid pressure acting on the opposite sides of the piston in the double acting piston and cylinder device.

Figure 4:
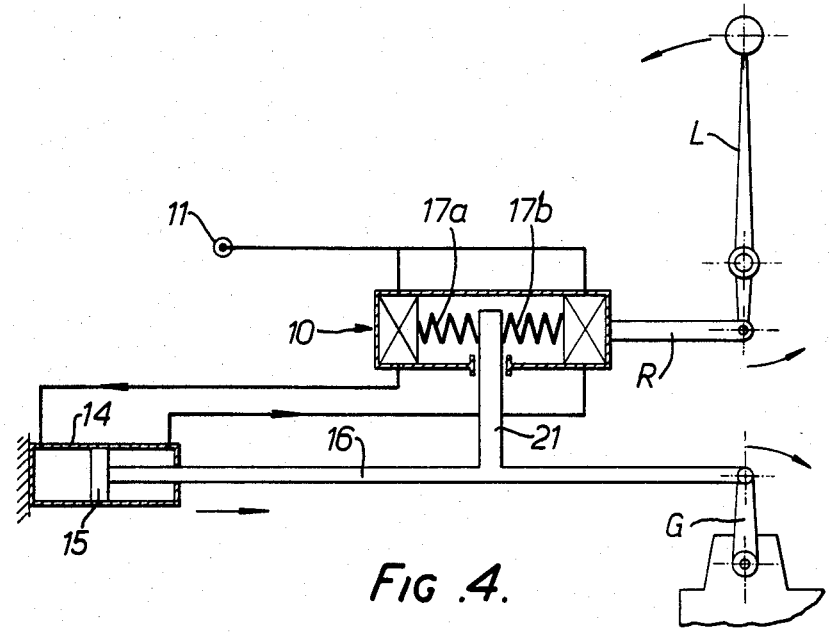
FIGS. 4 and 5 show an alternative use of the device shown in FIG. 1.
Figure 5:
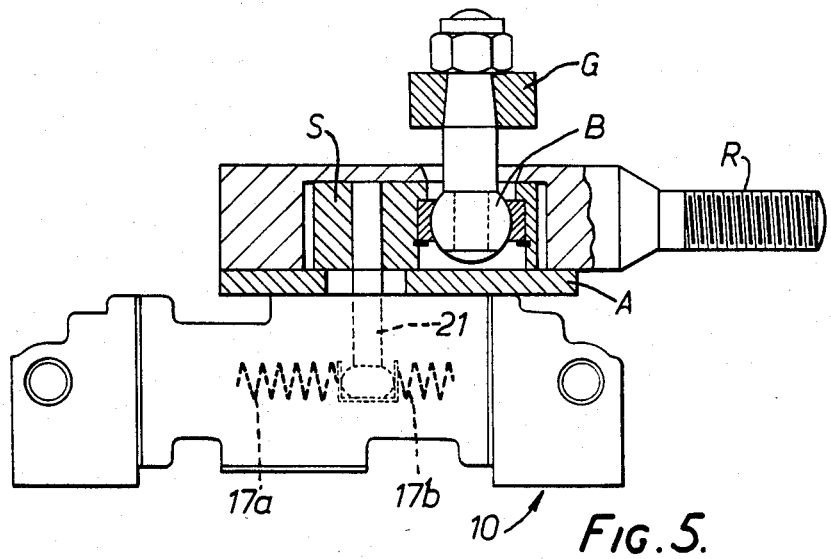

In an alternative application of the power assistance device to a gearbox gearshift device shown in FIGS. 4 and 5, a control lever L is connected by a rod R to an actuator A mounted on the body of the pressure regulator device 10. A lost motion connection is provided between the actuator and a slide S which carries a ball B which allows the rod to be rotated (to effect a gear selection) and articulated a limited amount relative to the load during a gear change, and the ball carries the gear selector and shift member G. The slide also carries the member 21 interposed between the regulator springs and which is connected to the piston rod 16. Thereby, actuating motion of the rod R moves the body of the pressure regulator device 10 to cause its pressure regulating action on the piston and cylinder device without disturbing the ball B and member 21 (because of the lost motion connection), and subsequent movement of the piston rod 16 acts through the member 21 to move the slide S and hence the ball B to initiate a gear change.

I claim:
1. A power assistance device comprising:
an input, an output, power assistance means between said input and said output, said power assistance means having piston and cylinder means, whereby said piston means is caused to move in said cylinder means by creating a fluid pressure differential across said piston means, said piston means having piston rod means, whereby said piston means applies load to said output, and
regulator means operable substantially simultaneously with operation of said input, whereby fluid pressure active on said piston means of said power is assistance means is variable, and whereby the effort applied by said piston rod means to said output is proportional to the effort applied to said input, said regulator means further comprising two spring controlled fluid pressure regulators having inlets connected to a fluid pressure source and outlets connected to said cylinder means to apply opposing fluid pressures to said piston means, said piston rod means being connected to a member interposed between the springs of said two regulators, said regulator means further having a body supporting said two regulators, whereby said body is acted upon by said input such as to be caused to move when effort is applied to said input whilst said member is initially stationary when effort is applied to said input, and whereby relative move- ment occurs between said body and said member which causes differential loading to be applied to said springs of said two regulators in accordance with the effort applied to said input, whereby said two regulators regulate the supply fluid pressures to said cylinder means in accordance with said loadings applied to said regulator springs such that said fluid pressure differential across said piston means is proportional to the difference between said loadings of said regulator springs, and whereby movement of said piston means when subjected to said fluid pressure differential cuases movement of said member relative to said body until the loadings of said springs are such that opposing fluid forces acting on said piston means are balanced.

2. The power assistance device of claim 1:
wherein said piston and cylinder means is a double acting piston and cylinder, said outlets of said fluid pressure regulators being connected to said cylinder on opposite sides of said piston.

3. The power assistance device of claim 1:
wherein a neutral position of said device has substantially equal pressures occurring on opposite sides of said piston means.

4. The power assistance device of claim 1:
wherein said fluid pressure regulators vary the opposing fluid pressures acting on said piston means to the limit of the fluid supply pressure of said fluid pressure source and thereafter said output is directly coupled to said output.

5. The power assistance device of claim 4:
wherein said output is directly coupled to said input when said member engages stop means fast with said body of said regulator means as happens when a required degree of magnification of the output effort with respect to the input effort is obtained.

6. The power assistance device of claim 1:
wherein said output comprises a gear selector and shift member, and said input comprises a translator acted upon by push-pull cable links, paired coincident movement of said links causing pivotal movement of said translator about an axis, said body of said regulator means pivoting with said translator, said gear selector and shift member being caused to pivot about the same axis upon movement of said piston rod means to initiate a gear change.

7. The power assistance device of claim 1:
where said output further comprises a gear shift member, and said input further comprises a translator acted upon by rod means, said translator carrying said member interposed between said regulator springs and a ball connected to said gear shift member with a lost motion connection between said translator and said member and ball, whereby actuating motion of said translator to move said body is not imparted to said member and said ball which themselves are moved upon motion of said piston rod means.

8. The power assistance device of claim 1:
where each said fluid pressure regulator further comprises a diaphragm biased by the associated regulator spring to open a regulator inlet valve to allow pressurized fluid to pass from said source through said regulator outlet to said cylinder means until such time as the pressure on the associated side of said piston means attains a value such that the forces acting on said piston means are balanced, whereby the fluid pressure will act on the associated diaphragm in opposition to said regulator spring bias applied thereto to close said regulator inlet valve, said movement of said regulator body causing one of said regulator springs to expand and the other to compress thereby causing one associated regulator to relieve to atmosphere and the other to increase the fluid pressure acting on said piston means by which a pressure differential acts thereon to effect movement of said piston means and hence movement of said output.

9. The power assistance device of claim 1:
wherein said input is subjected to manual effort.

10. The power assistance device of claim 1:
wherein said fluid is compressed air.

* * * * *